UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

CONDENSATION PRODUCT AND METHOD OF PRODUCING THE SAME.

1,253,261.      Specification of Letters Patent.      Patented Jan. 15, 1918.

No Drawing. Application filed March 20, 1913, Serial No. 755,799. Renewed June 28, 1916. Serial No. 106,493.

*To all whom it may concern:*

Be it known that I, JAMES P. A. McCOY, a subject of the King of Great Britain, and a resident of Wilkinsburg, in the county of Allegheny and State of Pennsylvania, have invented a new and useful Improvement in Condensation Products and Methods of Producing the Same, of which the following is a specification.

My invention relates to the manufacture of artificial condensation products, and it has particular reference to the manufacture of resinous condensation products by combining phenol or its homologues with formaldehyde or other substances containing active replaceable methylene groups in the presence of carbon dioxid as a condensing agent.

One object of my invention is to provide a solid and relatively insoluble and infusible, resinous condensation product, which shall have high dielectric strength and which may be cut, drilled, turned or molded into any desired shape or form.

Another object of my invention is to provide a process of producing substances of the above indicated character which is simple in its nature and which is inexpensive to a degree that permits of its profitable use upon a large commercial scale.

Another object of my invention is to provide a process of producing substances of the nature above described that may be arrested at any desired stage in the process in order to obtain products having certain properties differing wholly or in degree from those of the product of the complete process.

Another object of my invention is to provide a process which shall insure uniformity and definiteness in the resultant products.

Another object of my invention is to provide a method of producing substances of the character above described without the use of an acid or basic condensing agent, which may remain as a harmful ingredient in the final product.

In the processes known to the art for making condensation products of the same general nature as the substances produced by my invention, it has been the practice to employ as condensing agents either bases, such as ammonia, or strong acids, such as sulfuric acid. A portion of these materials may remain unchanged in the final product and it is then practically impossible to remove them. When present in this form, these materials are a source of danger from explosions caused by contact with other substances with which they react to form explosive mixtures or gases. Damage may be caused to fabrics or other substances to which the condensation products may be applied as coatings, or with which they may be combined in mixtures. An important advantage of my invention is that I avoid the use of strong basic or acid condensing agents and obtain a product that is free from any harmful substance.

My invention consists in the use of carbon dioxid as a condensing agent in the preparation of resinous products by reaction between phenol or its homologues and formaldehyde or other substances containing active replaceable methylene groups, and in the steps of the process hereinafter described for treating the condensation products so prepared.

It is to be particularly understood that the term "phenol," as hereinafter used in the specification and claims, is intended to embrace its homologues, isomers or compounds of which it is a component part, and the term "formaldehyde" is intended to include its polymers or other substances which contain one or more active replaceable methylene groups and which may be substituted in combination for formaldehyde, such for example, as hexamethylene tetramin.

In carrying out my process, various methods may be used. For example, carbon dioxid may be caused to pass through any desired quantity of phenol, the carbon dioxid being obtained from any desired or convenient source. Flue gases may be used after first washing them by passing through water to remove any sulfur dioxid, carbon or products of imperfect combustion that may be present. When the carbon dioxid is thus obtained from waste gases, its cost is practically negligible, and the addition of carbon dioxid may take place at any length, as an excess has no additional effect. A quantity of a 40% aqueous solution of formaldehyde may then be added to the product of the above combination, which consists of phenol containing absorbed carbon dioxid. While the relative amounts of these components may vary slightly, it is desirable that the phenol and formaldehyde be present in about molecular proportions. The chemical reaction which takes place in the mixture last referred to, results in a product consisting of two liquids, which readily separate or stratify. The lower or heavy stratum consists of an aqueous solution containing the water resulting from the reaction, or added with the reagents, and some formaldehyde, if an excess of the latter is present. The upper stratum consists of an oily viscous liquid. If the liquids are allowed to stand for several days, the ratio of their respective specific gravities changes and the relative positions of the liquids are reversed. The liquids are readily separable and the aqueous solution may be drawn off or may be evaporated as desired. The oily viscous liquid, which may be termed the initial condensation product, may then be treated in accordance with the methods hereinafter described.

In obtaining the initial condensation product, it is not essential that the phenol be treated with carbon dioxid before the addition of the methylene-containing material. The phenol and the methylene-containing material may first be combined and condensation caused to take place through the agency of carbon dioxid by passing the latter gas through the combined liquids until the separation has taken place. The carbon dioxid may be added only long enough to thoroughly saturate the combined liquids but, as above stated, an excess of carbon dioxid has no deleterious effect. Even less carbon dioxid than the amount necessary to saturate the liquids will produce the condensing effect, but it will ordinarily be found convenient to add the carbon dioxid until bubbles of the gas rise to the surface of the liquid.

The oily viscous liquid, which is obtained as above described, is soluble in alcohol, acetone, phenol, and other solvents. When cooled, the initial condensation product may become semi-plastic but is liquefied again when heated.

Continued heating of this product will result in a solid, infusible and insoluble substance which is non-absorbent and resists most chemical reagents. This material has a very high dielectric strength. The final product is transparent and resembles amber in appearance. In addition to the above qualities, the material is very strong, having a compression strength of approximately 30,000 lbs. per square inch.

The reagents are mixed at room temperature, and after the condensing reaction takes place, and the condensation product is recovered, it is usually heated in order to dry the product and hasten the hardening process. The degree of heat to which the mixture of reagents is subjected, and the duration of the heating, are determined by the amount of water present and the nature of the final product desired. When the condensation product has been separated by decantation from the layer of aqueous solution, it still contains a greater or less admixture of water, and the condensation product is first heated sufficiently to expel most of this water, the heat being raised gradually, as the water is evaporated, until a temperature is reached that is considerably above the boiling point of water, but not high enough to harm the condensation product. The speed at which the condensation product hardens is roughly in proportion to the degree of heat to which it is subjected, and its ultimate hardness depends upon the duration of the heating. In order to avoid the production of a porous mass because of the escape of vapors which are liberated, it is advisable to conduct the operation under pressure. The solid product may be obtained without subjecting the initial product to heat but the process is exceedingly slow and the application of heat is, therefore, desirable.

If it is desired to obtain the solid product in a particular shape or form, the heating process may be applied to the plastic material while in a mold or closed vessel in which pressure may be used and the result will be a homogeneous mass free from porosity and possessing the properties and characteristics above described. For the purpose of molding articles in this manner, the process of hardening the initial resinous product is arrested when the product has become infusible and insoluble, but is yet capable of softening under the influence of heat, and this partially hardened material is then subjected to heat and pressure in suitable molds.

By incorporating inert materials into the product when it is in a liquid state, a certain amount of shrinkage during the solidification process may be avoided and, in addition, the inert materials act as a filler to increase the volume of the product without detracting from its properties. These materials may be varied as desired and may be such as mica, asbestos, silica, graphite, rubber, nitrocellulose, and other fibrous, cellular, or granular substances. If rubber or nitrocellulose be used, the combination should be made while the material is in solution in order to insure a homogeneous product.

The final product may be given practically any desired color by adding suitable pigments or dyes of the preferred shade or tint before the mass is solidified, but, preferably, when the product is in the liquid or viscous state. Various colors may also be produced by adding reagents which react to produce the desired color.

As above stated, the process may be arrested at any desired stage. If this be done at an intermediate stage, the product may be rendered permanently plastic by the addition of solvents such as camphor or glycerin.

It will be readily understood by those skilled in the art that the method, by which the products of my invention are obtained, may be varied according to the properties desired in the resultant material, and such variations may be made in the specific details of the process within the scope and spirit of my invention as fall within the limits of the appended claims.

I claim as my invention:

1. A process for the manufacture of resinous products which comprises combining a phenolic substance with a substance containing an active replaceable methylene group, in the presence of carbon dioxid.

2. A process for the manufacture of resinous products which consists in combining a phenolic substance with an aldehyde in the presence of carbon dioxid.

3. A process for the manufacture of resinous products which consists in treating a phenolic substance with a substance containing an active replaceable methylene group in the presence of carbon dioxid and then applying heat to the resulting condensation product.

4. A process for the manufacture of resinous products which consists in combining a phenolic substance with a substance containing an active replaceable methylene group in the presence of carbon dioxid and then applying heat and pressure to the resulting condensation product.

5. A process for the manufacture of resinous products which consists in treating a phenolic substance with carbon dioxid and reacting upon the product with formaldehyde.

6. A process for the manufacture of resinous products which consists in treating a phenolic substance with carbon dioxid and reacting upon the product with an aqueous solution of formaldehyde.

7. A process for the manufacture of resinous products which consists in treating a phenolic substance with carbon dioxid, reacting upon the product with formaldehyde, and then applying heat to the resulting condensation product.

8. A process for the manufacture of resinous products which consists in treating a phenolic substance with carbon dioxid, reacting upon the product with formaldehyde, and then applying heat and pressure to the resulting condensation product.

9. A process for the manufacture of resinous products which consists in treating a phenolic substance with carbon dioxid, and transforming the resulting substance into an infusible, insoluble product by the addition of formaldehyde and the application of heat.

10. A process for the manufacture of resinous products which consists in treating a phenolic substance with carbon dioxid, reacting upon the product with an aqueous solution of formaldehyde, separating water from the resulting condensation product, and arresting the reaction when the product is infusible and insoluble, yet is capable of being softened by heat.

11. The method of making a shaped condensation product of a phenolic body and formaldehyde which consists in reacting upon a phenolic substance with formaldehyde in the presence of carbon dioxid, arresting the reaction when the product has become infusible and insoluble but is yet capable of softening under the influence of heat, shaping said product, and applying heat thereto.

12. A phenolic condensation product formed by combining a phenolic substance with a substance containing an active replaceable methylene group, in the presence of carbon dioxid.

13. A phenolic condensation product formed by treating a phenolic substance with formaldehyde in the presence of carbon dioxid.

14. An infusible, insoluble resinous product formed by reaction between a phenolic substance and formaldehyde in the presence of carbon dioxid and being free from alkalies and strong acids.

15. A shaped condensation product formed by reacting upon a phenolic substance with a substance containing an active replaceable methylene group in the presence of carbon dioxid, arresting the reaction when the product has become infusible and insoluble but is yet capable of softening under the influence of heat, shaping the said product and applying heat thereto.

16. A shaped condensation product formed by reacting upon a phenolic substance with formaldehyde in the presence of carbon dioxid, arresting the reaction when the product has become infusible and insoluble but is yet capable of softening under the influence of heat, shaping the said product and applying heat thereto.

In testimony whereof, I have hereunto subscribed my name this 10th day of March, 1913.

JAMES P. A. McCOY.

Witnesses:
J. R. LANGLEY,
B. B. HINES.